United States Patent
Serdynski et al.

(10) Patent No.: US 9,673,602 B2
(45) Date of Patent: Jun. 6, 2017

(54) SYSTEM FOR ISOLATING POWER CONDUCTORS USING COVER ASSEMBLIES

(71) Applicant: Rockwell Automation Technologies, Inc., Mayfield, OH (US)

(72) Inventors: David P. Serdynski, Waukesha, WI (US); Cody J. Pumala, Cameron, WI (US)

(73) Assignee: Rockwell Automation Technologies, Inc, Mayfield Heights, OH (US)

(*) Notice: Subject to any disclaimer, the term of this patent is extended or adjusted under 35 U.S.C. 154(b) by 36 days.

(21) Appl. No.: 14/970,915

(22) Filed: Dec. 16, 2015

(65) Prior Publication Data

US 2017/0098928 A1   Apr. 6, 2017

Related U.S. Application Data

(60) Provisional application No. 62/236,388, filed on Oct. 2, 2015.

(51) Int. Cl.
| | |
|---|---|
| *H02G 5/00* | (2006.01) |
| *H02G 15/18* | (2006.01) |
| *H02G 3/14* | (2006.01) |
| *H02G 3/08* | (2006.01) |

(52) U.S. Cl.
CPC ............... *H02G 5/00* (2013.01); *H02G 3/081* (2013.01); *H02G 3/14* (2013.01); *H02G 15/18* (2013.01)

(58) Field of Classification Search
CPC  H02G 5/00; H02G 15/18; H02G 3/14; H02G 3/081

USPC ........... 361/600–624; 174/66–67, 70 R–71 C
See application file for complete search history.

(56) References Cited

U.S. PATENT DOCUMENTS

| | | | | |
|---|---|---|---|---|
| 6,077,102 A | * | 6/2000 | Borzi ................... | H01R 9/2458 439/364 |
| 2006/0239798 A1 | * | 10/2006 | Chantrel .................. | H02G 5/00 411/546 |
| 2013/0220669 A1 | * | 8/2013 | Robinson ............... | H02B 1/056 174/135 |
| 2015/0111426 A1 | * | 4/2015 | Buettner .................. | H02G 5/00 439/607.01 |
| 2015/0229111 A1 | * | 8/2015 | Kutalek ................... | H02G 3/24 174/166 S |
| 2015/0303669 A1 | * | 10/2015 | Maebashi ............ | H05K 5/0052 174/68.2 |

* cited by examiner

*Primary Examiner* — Anthony Haughton
*Assistant Examiner* — Yahya Ahmad
(74) *Attorney, Agent, or Firm* — Boyle Fredrickson, S.C.

(57) ABSTRACT

An improved electrical system may be provided by electrically isolating exposed live fasteners and bus clamps in power distribution systems by attaching electrically insulating snap-based cover assemblies to the live fasteners and bus clamps. A cover assembly may include a plate element and an electrically insulating cap element. The plate element may have a plate opening and a beveled edge, and the electrically insulating cap element may have a cap edge followed by an interior recess. The cap element and the plate element may be held together by snapping the cap element over the plate element such that the beveled edge fits into the interior recess and the cap edge fits below the beveled edge. The cover assembly may be attached to a fastener or bus clamp via the plate opening.

20 Claims, 9 Drawing Sheets

FRONT

REAR

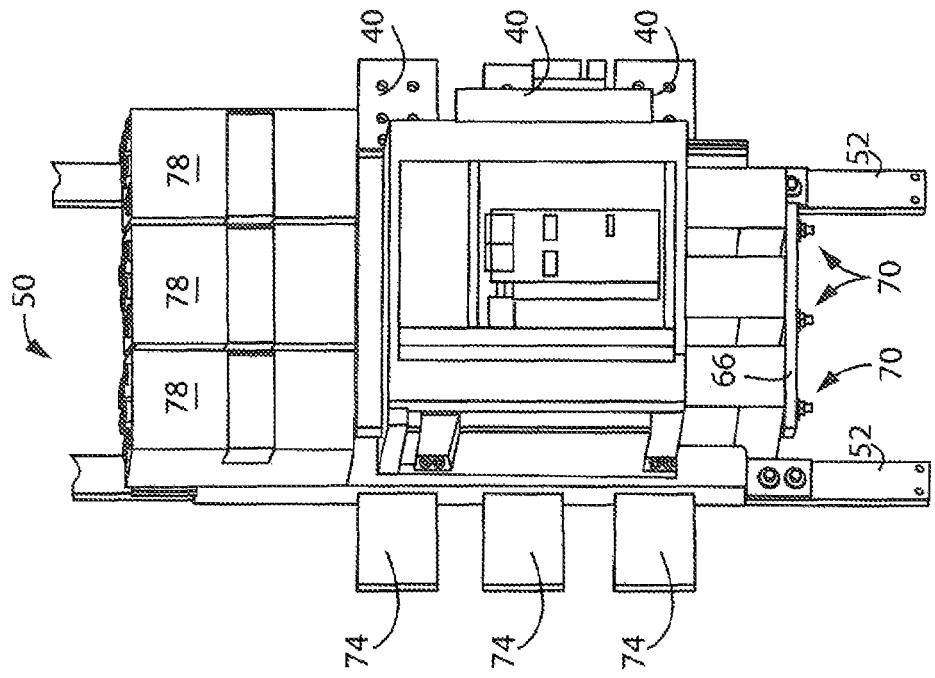
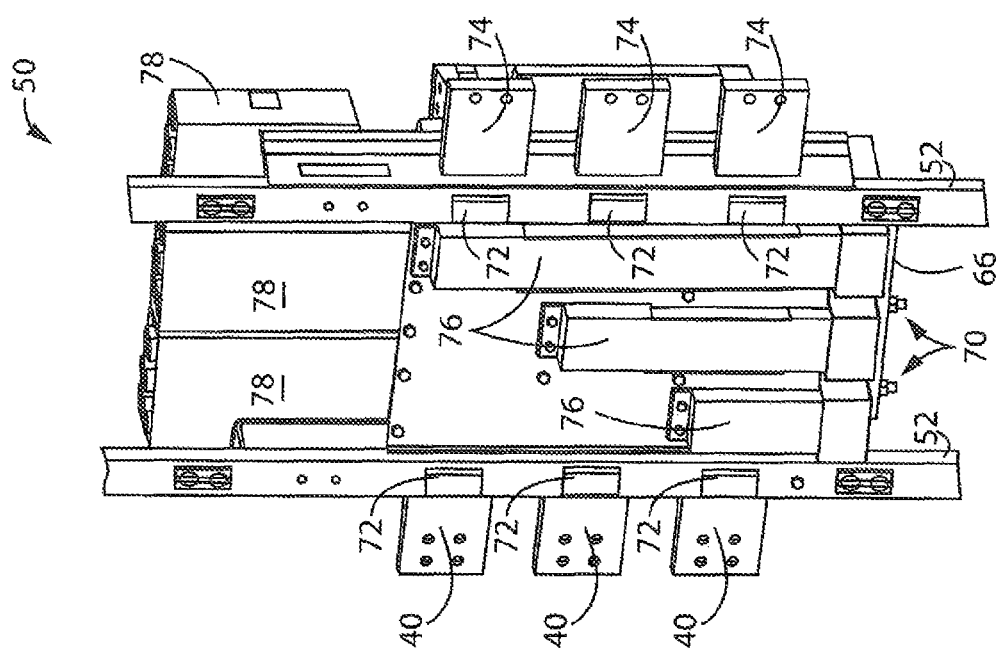
FIG. 4B
FRONT
FIG. 4A
REAR

SYSTEM FOR ISOLATING POWER CONDUCTORS USING COVER ASSEMBLIES

CROSS-REFERENCE TO RELATED APPLICATIONS

This application claims priority to U.S. Provisional Patent Application No. 62/236,388, entitled "System for Isolating Power Conductors Using Cover Assemblies," filed on Oct. 2, 2015, which is herein incorporated by reference.

FIELD OF THE INVENTION

The present invention relates generally to electrical systems, such as for the distribution of power signals to controlled equipment, and more particularly, to electrical isolation in such systems.

BACKGROUND OF THE INVENTION

Electrical systems with packaged electrical and electronic components are known and are in use. For example, Motor Control Centers (MCC's) are used for power and data distribution in large and industrial operations. In MCC's, a variety of components, such as switchgear, semiconductor power electronic circuits, programmable logic controllers, motor controllers, and so forth, are housed in large electrical enclosures that may be subdivided into sections or columns, which may be further subdivided into compartments. The MCC includes associated bus bars, interconnections and supporting structures for distribution of electrical power to the various compartments.

Typically, the MCC is connected to a main power line that may feed three-phase AC power to horizontal bus bars of the MCC. The horizontal bus bars, in turn, may feed the three-phase power to vertical bus bars disposed in each of the sections or columns of the MCC. The vertical bus bars, in turn, may feed the three-phase power to various units (which typically include electrical components) that are installed in compartments of a section. The units, in turn, may provide power terminals (conductors), such as copper bus bars, for feeding the three-phase power to a system environment, such as motors, as may be required for various applications.

However, in order to meet minimum electrical short-circuit protections, such as in accordance with International Electrotechnical Commission (IEC) and/or Underwriters Laboratories (UL) standards, power conductors should be sufficiently insulated and/or mounted with adequate distance from other conductive parts (including neighboring power conductors). Accomplishing this while providing adequate structural mounting and/or support for the MCC and/or constituent components of the MCC is particularly challenging. A need therefore exists to provide the aforementioned electrical short-circuit protections while providing adequate structural mounting and/or support.

SUMMARY OF THE INVENTION

The present inventors have recognized that exposed live fasteners and bus clamps in power distribution systems may be electrically isolated by attaching electrically insulating snap-based cover assemblies to the live fasteners and bus clamps. A cover assembly may include a plate element and an electrically insulating cap element. The plate element may have a plate opening and a beveled edge, and the electrically insulating cap element may have a cap edge followed by an interior recess. The cap element and the plate element may be held together by snapping the cap element over the plate element such that the beveled edge fits into the interior recess and the cap edge fits below the beveled edge. The cover assembly may be attached to a fastener or bus clamp via the plate opening.

Convenient insulating plugs may be provided to allow standard epoxied (or otherwise insulated) conductors to be used in multiple assembly configurations.

In an alternative aspect, a plastic cap or boot may be wrapped around the beveled edge of the plate element to mechanically interlock with the plate element and provide an electrically insulating cap element.

Accordingly, exposed live fasteners and bus clamps may be electrically isolated from one another. As a result, an improved electrical system may be provided that is less susceptible to "arc flash" (a phenomena in which a luminous discharge of current is formed when a current jumps a gap, through air or gas, in a circuit or between two conductors) and/or other hazards.

Aspects of the invention may allow for the insulation of hardware, current exchanges, and structural clamp joints without compromising the integrity of the joint or supported members. The invention may be part of a system for insulating buses, such as in compliance with the International Electrotechnical Commission (IEC) 61641:2014 guide for testing under conditions of arcing due to internal fault. Accordingly, structural clamp joints may be provided which protect from creeping over time, and with temperature, while also providing required insulation.

A fastener, bus clamp or other power conductor may be "live" if it carries electrical current or charge, such as by going through a bus for structural mounting and/or current exchange. The cover assemblies may protect against such exposed live fasteners used in assembly.

In another aspect, a molded part may be provided with or without a living hinge connecting a cover to a clamp plate. The clamp plate may include a rigid or metallic insert to allow a creep free clamp joint to be established using existing fastener designs on a Low Voltage Motor Control Center ("LVMCC"). The cover may snap over the installed clamp plate (similar to caps that snap over hardware holding a toilet base mounted to a floor). Unlike current solutions, snap caps allow easy removal in the field for service, and also quick re-use in the field. Snap plugs can similarly be applied.

Snap caps and snap plugs eliminate the need for adhesives, multiple steps to assembly, dry time, risk of poor adhesion or falling if bumped in factory, shipping, or in the field. Snap caps and snap plugs will not fall off over time due to heat like electrical tape. A solid/metal insert in the snap caps allows for long term secure clamp joints with live hardware as it eliminates the potential for creep in the clamp joint which would otherwise result in loose assemblies in the field.

Snap caps and snap plugs can be removed and reused in the field for service and maintenance without the use of excessive labor content, excessive system interruption, or the need for any replacement parts or adhesives. Snap caps and snap plugs also allow for field retrofit converting and existing installation into insulated bus systems without the use of special tools.

Specifically then, one aspect of the present invention provides a cover assembly including: a plate element having at least one plate opening and a beveled edge; and an electrically insulating cap element having a cap edge followed by an interior recess. The cap element and the plate element may be configured to be held together by the beveled edge fitting into the interior recess and the cap edge fitting below the beveled edge. The cover assembly may be configured to be retained by the at least one plate opening.

Another aspect of the invention provides a system for isolating power conductors including: first and second power conductors disposed proximal to one another, and a cover assembly. The cover assembly may include: (a) a plate element having at least one plate opening and a beveled edge; and (b) an electrically insulating cap element having a cap edge followed by an interior recess. The cap element and the plate element may be configured to be held together by the beveled edge fitting into the interior recess and the cap edge fitting below the beveled edge. The first power conductor may retain the cover assembly by the at least one plate opening, and the cover assembly may electrically isolate the first power conductor from the second power conductor via the electrically insulating cap element.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

FIG. 4A is a rear view of the bus support of FIG. 3A in which cover assemblies are used to electrically isolate live power conductors, and FIG. 4B is a front view of the bus support of FIG. 4A, in accordance with an aspect of the invention;

DETAILED DESCRIPTION

Figure 1:
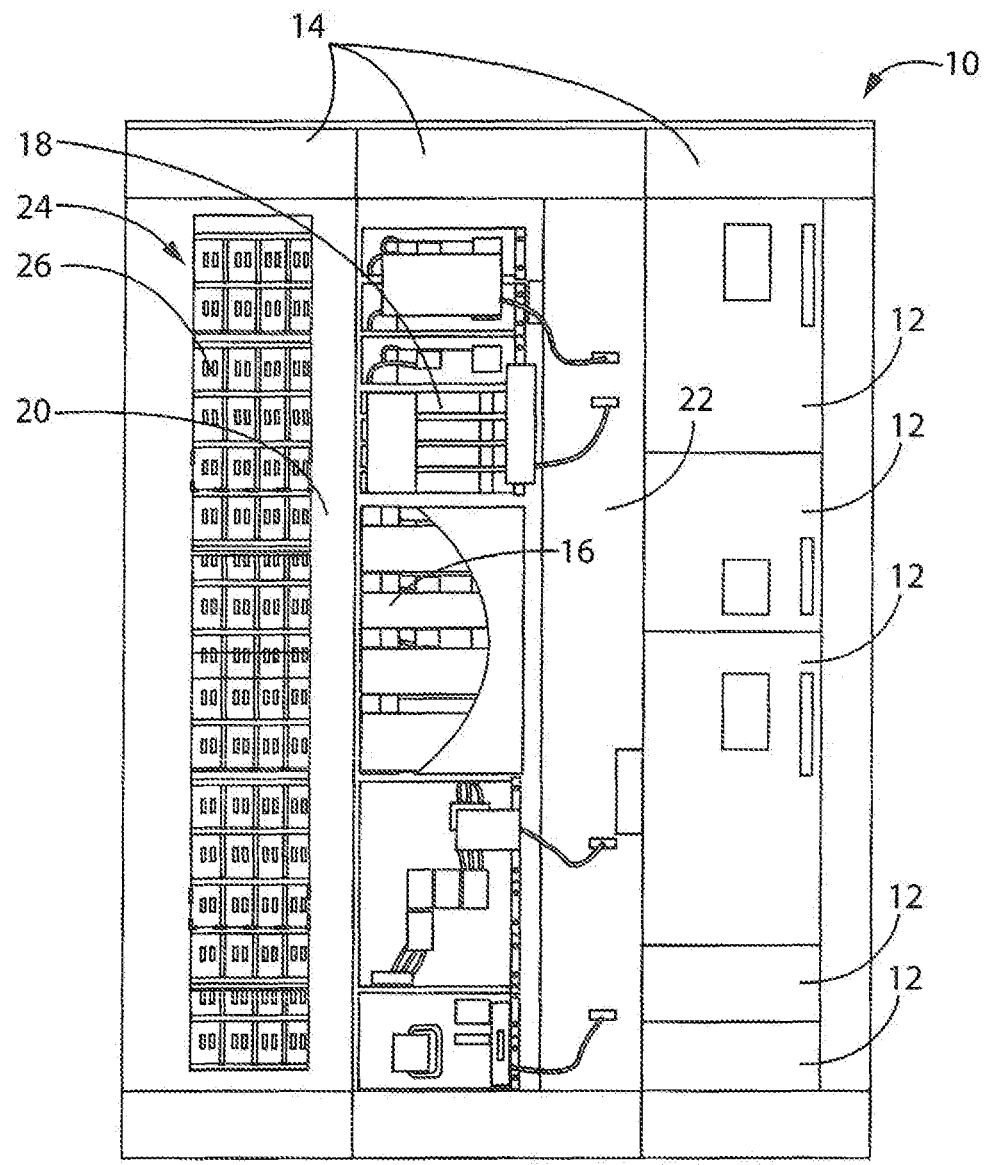
FIG. 1 is an exemplary electrical system in which electrical units of various types may be housed in accordance with an aspect of the invention.

Referring now to FIG. 1, an exemplar electrical system 10 is provided in which electrical units 12 of various types may be housed. The electrical system 10 may be, for example, a Motor Control Center ("MCC") or other industrial, commercial, marine, or other electrical system. In general, the electrical system 10 may provide one or more sections 14, each forming a shell around a device mounting volume for supporting the units 12. The shell may be made of any suitable material, such as heavy gage sheet metal, reinforced plastics, and so forth. The electrical system 10 may typically receive three-phase power from an external power supply, such as a power supply grid, and/or data signals, via appropriate conduits (not shown), and distribute the received power and/or data signals to one or more of the sections 14 in various manners. The sections 14 may be electrically isolated from one another, or alternatively, may be electrically joined with other sections 14, such as via common horizontal power buses 16.

The units 12 may each include a door for covering an assembly of components 18 that are supported within each unit 12 via known methods, such as screwed or snap-in engagement, thereby providing mechanical and electrical connection to the electrical system 10. Exemplary components 18 of the units 12 may include relays, motor starters, and Programmable Logic Controllers ("PLC's"), among others. Doors for the units 12 may include, for example, a lever for opening the door, a lock for preventing the door from opening, and/or light for indicating a safe condition for opening the door. A latch rail (not shown) may be provided in each section 14 to interface with latches on the individual doors of the units 12.

The sections 14 may also include wire-ways 20 in which line and load wiring, cabling and so forth may be installed to service the components 18. The sections 14 may optionally include preconfigured isolation areas 22 for variations in which greater electrical isolation between sections 14 is desired.

Along a rear wall of each of the sections 14 may be disposed a vertical bus system 24 configured to facilitate distribution of power throughout a corresponding section 14, such as in a plug-in manner. The bus system 24 may be generally formed as a backplane having slots 26 for receiving conventional stab-type electrical connections on rear surfaces of device supports received within a section 14. Such slot and stab arrangements are generally known in the art. As illustrated, the slots 26 may be divided into pairs to receive a corresponding two-pronged stab for each phase of electrical power. Rows of such slots 26 may be provided to allow device supports to be mounted at various levels within a section 14.

Figure 2:
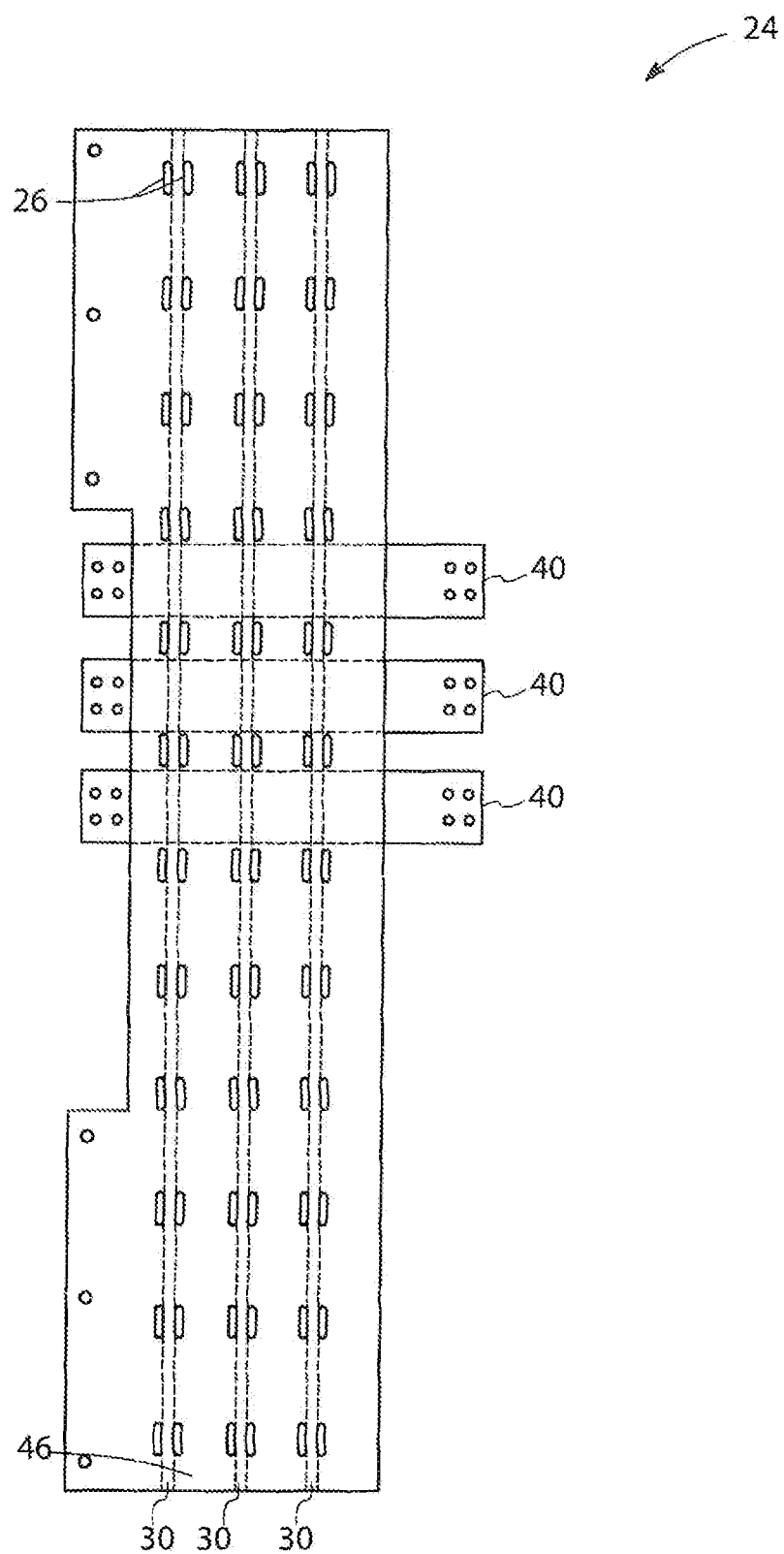
FIG. 2 is an exemplary bus system which may be included within a section of the electrical system of FIG. 1 in accordance with an aspect of the invention.

Referring now to FIG. 2, an exemplary configuration of the bus system 24 of FIG. 1 is provided. The bus system 24 may include multiple power busses disposed within a section 14. In the illustrated embodiment, the bus system 24 includes first, second and third vertical bus conductors 30 disposed proximal to one another, which may correspond to differing phases of a three-phase power system (power conductors). Further, the bus system 24 includes first, second and third horizontal bus conductors 40 disposed proximal to one another, which may also correspond to the differing phases of the three-phase power system (power conductors), but in a different direction.

In certain embodiments, the horizontal bus conductors 40 could be coupled to cabling that supplies three-phase power from an external power supply, such as a power supply grid, and the first, second and third horizontal bus conductors 40 could be coupled to the first, second and third vertical bus conductors 30. Also, in certain embodiments, the horizontal bus conductors 40 of one section could be coupled (or "spliced") with the horizontal bus conductors 40 of another (flanking) section. In alternative embodiments, more horizontal and/or vertical bus conductors could be provided, such as for providing a neutral conductor, a protective earth, ground or additional power phase, or fewer horizontal and/or vertical bus conductors could be provided, as appropriate for the environment.

The bus system 24 may include a bus cover 46 and a rear bus support. In the illustrated embodiment, the bus cover 46 may include a molded sheet of synthetic material disposed over the vertical and horizontal bus conductors and may serve to prevent contact with underlying power busses except through the slots 26. The vertical bus conductors 30 are typically made of a bar stock or tubing stock with a flat area that permits them to be mechanically and electrically coupled to corresponding horizontal bus conductors 40 in the bus system 24.

Connection of component supports (such as mounted on plates or drawers, not shown) may be made by two pronged stabs that are received through the slots 26 and engage the individual bus bars behind the bus cover 46. As described above, the bus system 24 further includes a bus support configured to support the vertical and horizontal bus conductors.

Figure 3B:
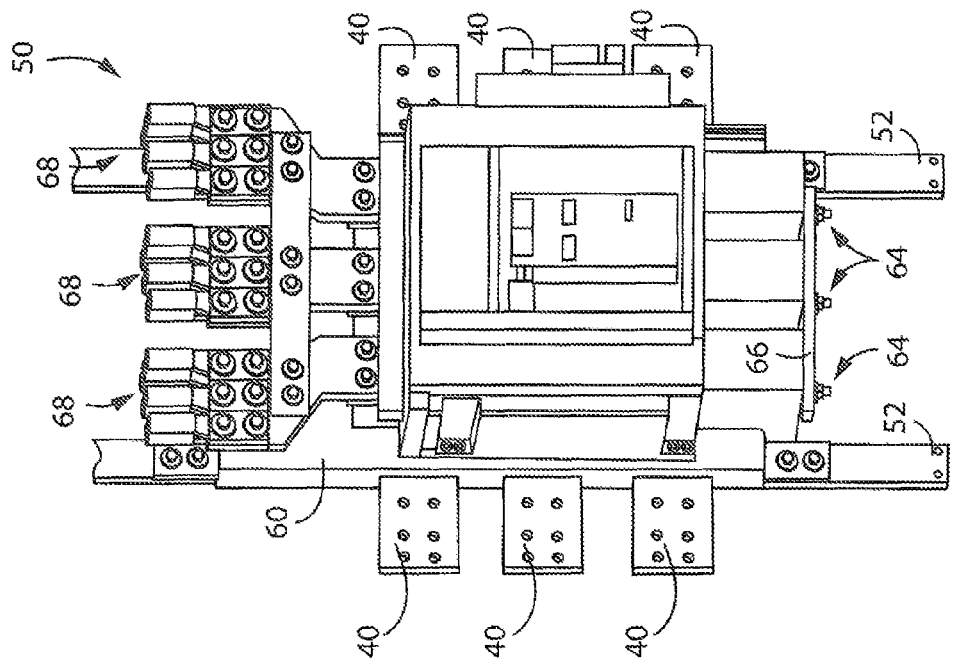
FIG. 3B is a front view of the bus support of FIG. 3A, in accordance with an aspect of the invention.
Figure 3A:
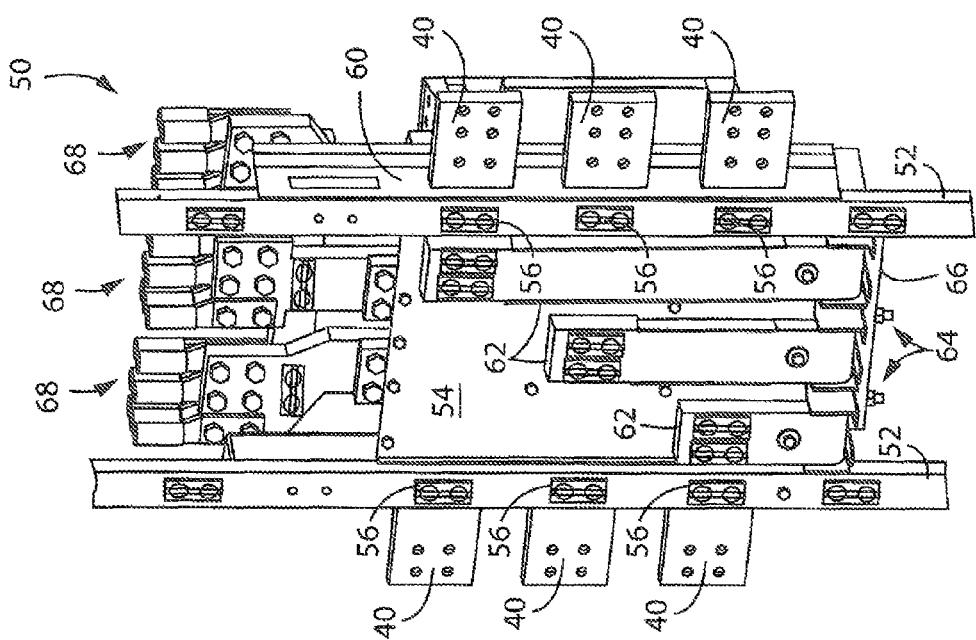
FIG. 3A is a rear view of a bus support with horizontal bus conductors disposed thereon.

Referring now to FIGS. 3A and 3B, exemplar rear and front views, respectively, are provided for a power distribution system 50 which may be provided for the bus system 24 in the electrical system 10. The power distribution system 50 may be positioned behind the bus cover 46 in a section 14. Vertical support braces 52 may be provided to facilitate framing and mounting for various structures in the power distribution system 50, including the horizontal bus conductors 40 and an isolation plate 54. Accordingly, the vertical support braces 52 may be fastened to the horizontal bus conductors 40 via bus clamps 56, thereby causing the bus clamps 56 to be "live" (carrying electrical current or charge, in this case corresponding to a power phase going through a horizontal bus conductor). The bus clamps 56 may be, for example, a pair of screws or bolts with a washer and/or nut assembly. The vertical support braces 52 may be manufactured from an electrically insulating material, such as glass filled polyester, and may provide sufficient strength to securely support the various structures from torqueing during a high current event, such as a short circuit or arc flash.

A vertical insulating barrier 60 may also be provided on edges of the power distribution system 50. The vertical insulating barrier 60 may be contoured around the horizontal bus conductors 40 to provide electrical isolation and protection in gaps between the horizontal bus conductors 40.

Power bus risers 62 may be fastened to respective horizontal bus conductors 40, through apertures or holes in the isolation plate 54, to provide corresponding electrical power phase connections to the horizontal bus conductors 40 from the external power supply received by the electrical system 10. Fasteners 64, which may be, for example, screws or bolts with washer and/or nut assemblies, are used to securely fasten the power bus risers 62 to a base plate 66 at a bottom portion of the power distribution system 50. Accordingly, the fasteners 64 may also be "live" (carrying electrical current or charge, in this case corresponding to a power phase going through a power bus riser). Incoming lug pads 68 may be fastened at a top portion of the power distribution system 50 which may also include electrical power supplies of various phases. Consequently, various live power conductors may be left exposed in the system.

Referring now to FIGS. 4A and 4B, exemplar rear and front views, respectively, are provided in which cover assemblies are used to electrically isolate various live power conductors in the power distribution system 50. In particular, first types of cover assemblies 70, each in the form of a round snap cap, may be attached to the fasteners 64. In addition, second types of cover assemblies 72, each in the form of a rectangular snap cap, may be attached to the bus clamps 56. Exterior surfaces of the cover assemblies, whether the first type of cover assembly 70, the second type of cover assembly 72, or another type, are electrically insulating. As a result, the exposed live power conductors in the power distribution system 50 are electrically isolated to improve the electrical system 10.

In addition, electrically insulating sheets of various types may be folded in multiple directions around other live elements in the system. For example, electrically insulating sheets 74 may be folded in multiple directions around ends of the horizontal bus conductors 40, shown on one side, to electrically insulate the ends of the horizontal bus conductor 40 from other live elements in the system. Also, electrically insulating sheets 76 may be folded in multiple directions around the power bus risers 62 to electrically insulate the power bus risers 62 from other live elements in the system. Also, electrically insulating sheets 78 may be folded in multiple directions around the incoming lug pads 68 to electrically insulate the incoming lug pads 68 from other live elements in the system.

Figure 5:
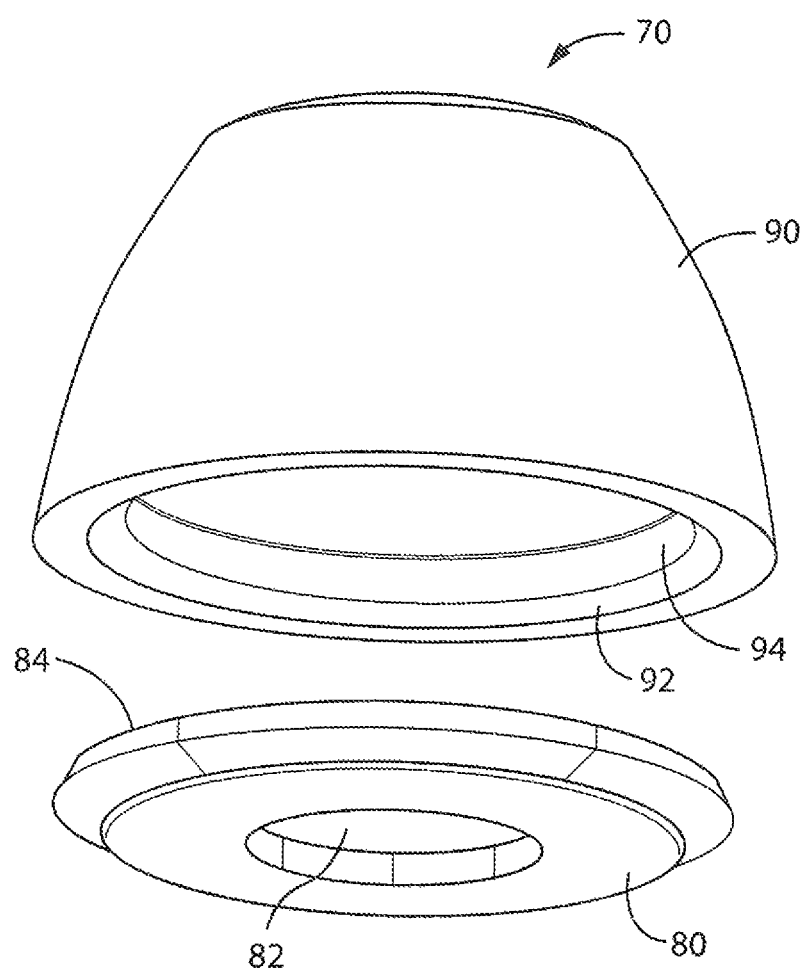
FIG. 5 is an isometric view of a cover assembly in accordance with an aspect of the invention.

Referring now to FIG. 5, the cover assembly 70 of the first type (snap cap), which may be used for covering and electrically isolating a single live fastener 64, may include a plate element 80 and an electrically insulating cap element 90. The plate element 80 includes a plate opening 82, which may be an aperture or hole, for allowing the passage of a retaining mechanism, such as a screw, bolt, clip or other fastener. The plate element 80 also includes an outer beveled edge 84, which may be an outer circumferentially beveled or angled edge as illustrated, for positive retention with respect to the cap element 90.

The plate element 80 may preferably be manufactured from metal or any other material capable of providing rigid retention for screws, bolts, clips or other fasteners while also withstanding elevated temperatures which may be associated with a high current event. In one form, the plate element 80 may resemble a washer with a circumferentially beveled outer edge.

The cap element 90 includes an inner cap edge 92, which may be an inner circumferential edge, followed by an interior recess 94 contained within a volume of the cap element 90. The cap element 90 is configured to snap over (or push onto) the plate element 80 and be securely retained by the plate element 80 to form the cover assembly. As a result, the need for adhesives (such as silicone) to secure boots over fasteners may be eliminated, and snap caps which are serviceable, re-useable, and unlikely to be inadvertently knocked off during shipping (or contacted when working within a unit or section) may be provided. Accordingly, the cap element 90 may be attached to the plate element 80 upon snapping or pushing the cap element 90 onto the plate element 80 with the beveled edge 84 of the plate element 80 fitting into the interior recess 94 of the cap element 90, and the cap edge 92 of the cap element 90 fitting below the beveled edge 84 of the plate element 80.

The cap element 90 may be manufactured from any electrically insulating material, such as rubber or plastic. The cap element 90 may provide a limited amount of flexibility for assembly, such as to allow limited expansion of the cap edge 92 over the beveled edge 84, followed by contraction of the cap edge 92 below the beveled edge 84. The cap element 90 may also be black in color to maximize radiant cooling. In one form, the exterior of the cap element 90 may resemble a closed (cap) nut.

Although the plate element 80 securely retains the cap element 90, it is still possible to remove the cap element 90 from the plate element 80, such as by prying the cap element 90 upwards, away from the plate element 80. A flat blade of a screw driver or other tool may be used to assist with prying the cap element 90 from the plate element 80. Removal of the cap element 90 may be desirable at times in the field, such as for servicing various aspects of the power distribution system 50. After service is complete, the same cap element 90 may be used again, reattaching to the same plate element 80.

Figure 6:
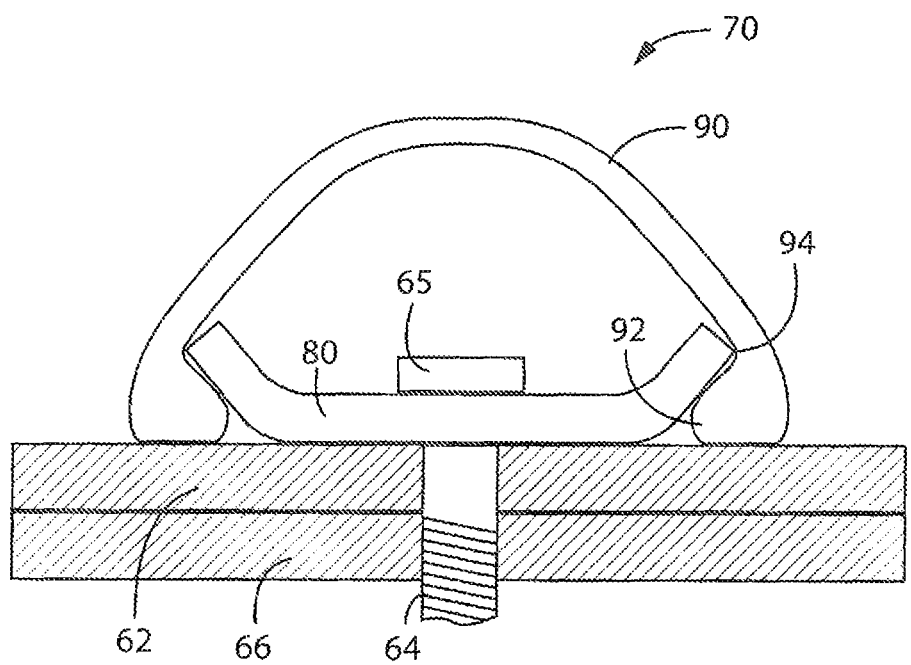
FIG. 6 is a cross section of the cover assembly of FIG. 5.

Referring now to FIG. 6, a cross section of an exemplar cover assembly 70 retained by a fastener 64 in the power distribution system 50 is provided. A fastener 64, which may securely fasten a power bus riser 62 to a base plate 66, for example, may be a "live" fastener carrying an electrical charge. As a result, an end 65 of the fastener 64, which may be the head of a screw, bolt or clip, for example, may be exposed in the electrical system 10 to another end 65 of another fastener 64, or to another exposed live power conductor. Consequently, electrical isolation of the end 65 of the fastener 64 is desirable.

For attachment, the plate opening 82 of the plate element 80 may first be aligned with the aligned apertures or holes in the system, such as the aligning apertures or holes of the power bus riser 62 and the base plate 66. Then, the fastener 64 may pass through the plate opening 82 and into the aligning apertures or holes in the system to provide the desired fastening. This will leave the head 65 of the fastener 64 (which is larger than the plate opening 82) exposed over the plate element 80 to thereby securely hold the plate element 80 in position. Then, the cap element 90 is snapped over (or pushed onto) the plate element 80, such that the beveled edge 84 of the plate element 80 fits into the interior recess 94 of the cap element 90, and the cap edge 92 of the cap element 90 fits below the beveled edge 84 of the plate element 80. The cap element 90 will then rest flush with the system, such as the base plate 66, completely enclosing the plate element 80 and the head 65 of the fastener 64 with its interior volume. As the cap element 90 is manufactured from an electrically insulating material, the cap element 90 electrically isolates the head 65

Figure 8:
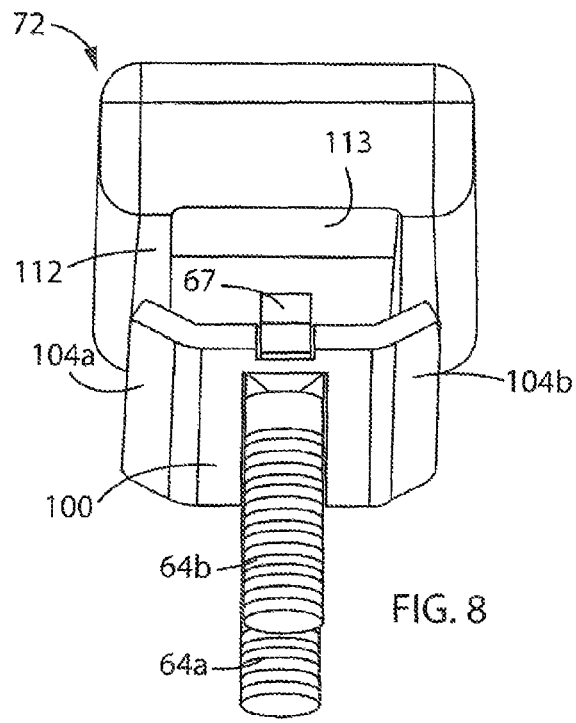
FIGS. 7 and 8 are isometric views of an alternative cover assembly in accordance with an aspect of the invention.
Figure 7:
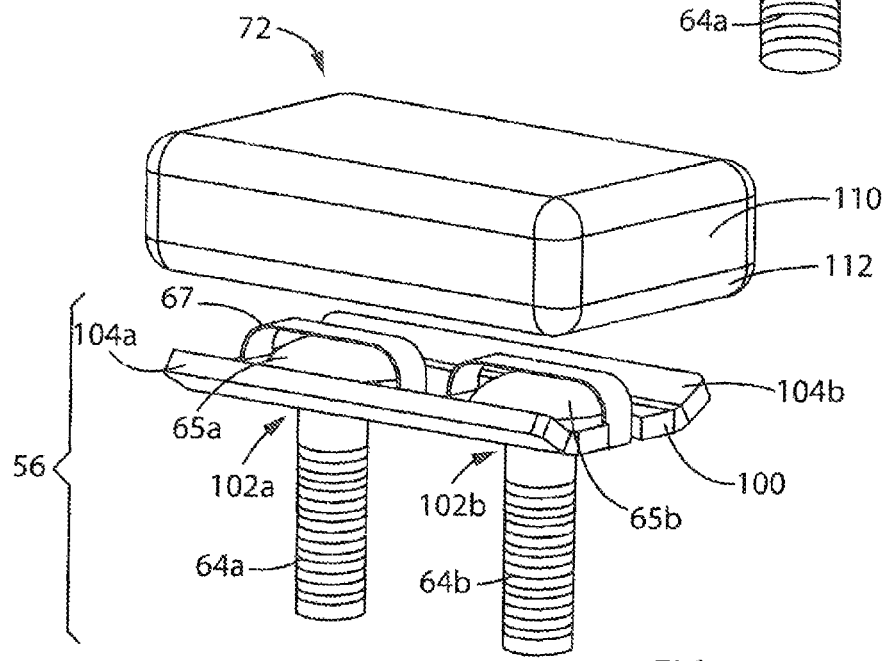

Referring now to FIGS. 7 and 8, the cover assembly 72 of the second type (rectangular snap cap), which may be used for covering and electrically isolating multiple live fasteners 64, such as part of a bus clamp 56, is shown. The cover assembly 72 may include a plate element 100 and an electrically insulating cap element 110. The plate element 100 includes one or more plate openings, which may be a single or multiple apertures or holes for allowing the passage of one or more retaining mechanisms, such as screws, bolts, clips or other fasteners, in various manners, such as first and second plate openings 102a and 102b, respectively, allowing passing of first and second fasteners 64a and 64b, respectively, which fasteners may be further locked by tab 67 as part of bus clamp 56. The plate element 100 also includes an outer beveled edge, which may be an outer circumferentially beveled or angled edge, or outer first and second beveled edges 104a and 104b, respectively, on opposing sides as illustrated, for positive retention with respect to the cap element 110. The plate element 100 may preferably be manufactured from metal or any other material capable of providing rigid retention for screws, bolts, clips or other fasteners while also withstanding elevated temperatures which may be associated with a high current event.

The cap element 110 includes an inner cap edge 112, which may be an inner circumferential edge as shown, or opposing edges for interlocking with the first and second beveled edges 104a and 104b, respectively, followed by an interior recess contained within an interior volume 113 of the cap element 110. Similar to the cover assembly 70 described above with respect to FIGS. 5 and 6, the cap element 110 is configured to snap over (or push onto) the plate element 100 and be securely retained by the plate element 100 to form the cover assembly. Accordingly, the cap element 110 may be attached to the plate element 100 upon snapping or pushing the cap element 110 onto the plate element 100, with the first and second beveled edges 104a and 104b, respectively, of the plate element 100 fitting into the interior recess of the cap element 110 in the interior volume 113, and the cap edge 112 of the cap element 110 fitting below the first and second beveled edges 104a and 104b, respectively, of the plate element 100.

The cap element 110 may be similarly manufactured from any electrically insulating material, such as rubber or plastic. The cap element 110 may provide a limited amount of flexibility for assembly, such as to allow limited expansion of the cap edge 112 over the first and second beveled edges 104a and 104b, respectively, followed by contraction of the cap edge 112 below the first and second beveled edges 104a and 104b, respectively. The cap element 110 may also be black in color to maximize radiant cooling.

Although the plate element 100 securely retains the cap element 110, it is still possible to remove the cap element 110 from the plate element 100, such as by prying the cap element 110 upwards, away from the plate element 100. A flat blade of a screw driver or other tool may be used to assist with prying the cap element 110 from the plate element 100. Removal of the cap element 110 may be desirable at times in the field, such as for servicing various aspects of the power distribution system 50. After service is complete, the same cap element 110 may be used again, reattaching to the same plate element 100.

Accordingly, the first and second fasteners 64a and 64b, respectively, of a bus clamp 56, which may securely fasten a power bus riser 62 to a horizontal bus conductor 40 or a particular power phase, for example, may be "live" fasteners carrying an electrical charge. As a result, first and second ends 65a and 65b, respectively, of the first and second fasteners 64a and 64b, respectively, may be the heads of screws, bolts or clips, for example, and the tab 67 of the bus clamp 56, may be exposed in the electrical system 10 to another bus clamp 56 of another power phase, or to another exposed live power conductor. Consequently, electrical isolation of the bus clamp 56 is desirable.

For attachment, the first and second plate openings 102a and 102b, respectively, may first be aligned with the aligned apertures or holes in the system, such as the aligning apertures or holes of the power bus riser 62 to the horizontal bus conductor 40. Then, the first and second fasteners 64a and 64b, respectively, may pass through the first and second plate openings 102a and 102b, respectively and into the aligning apertures or holes in the system to provide the desired fastening. This will leave the first and second ends 65a and 65b, respectively, (which are larger than the first and second plate openings 102a and 102b, respectively) exposed over the plate element 100 to thereby securely hold the plate element 100 in position. Then, the cap element 110 is snapped over (or pushed onto) the plate element 100, such that the first and second beveled edges 104a and 104b, respectively, fit into the interior recess of the cap element 110 in the interior volume 113, and the cap edge 112 of the cap element 110 fits below the first and second beveled edges 104a and 104b, respectively. The cap element 110 will then rest flush with the system, such as the power bus riser 62, completely enclosing the bus clamp 56 with the interior volume 113. As the cap element 110 is manufactured from an electrically insulating material, the cap element 110 electrically isolates the bus clamp 56.

It will be appreciated that a variety of plate openings, plate edges, cap edges and recess configurations may be provided for various configurations within the scope of the invention.

Figure 9:
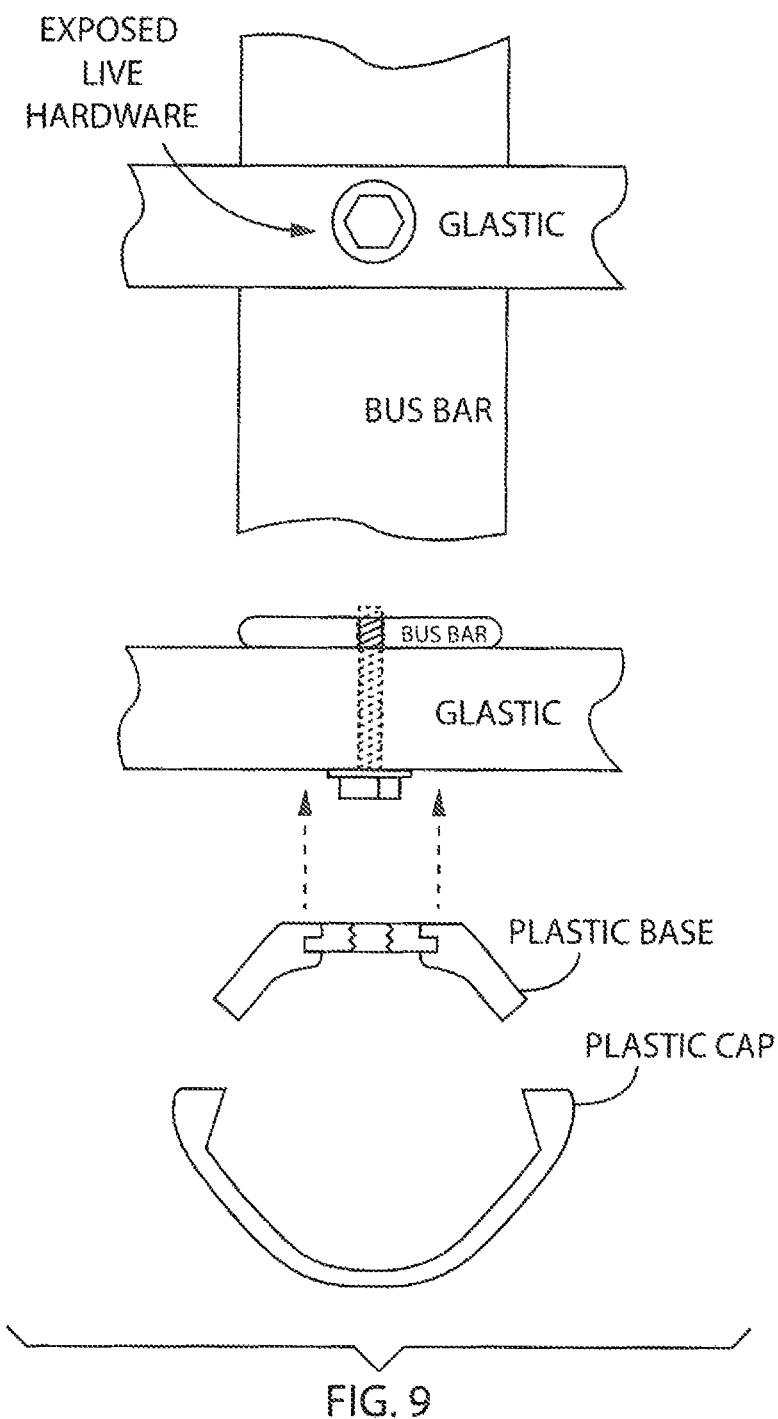
FIG. 9 illustrates a system and method by which a cover assembly may be applied in accordance with an aspect of the invention.

Referring now to FIG. 9, additional aspects of a cover assembly are provided. In particular, a method may be provided in which live exposed fasteners are electrically insulated with snap caps. A plastic cap may fit over a plastic base (or plate element) having a metal insert with a plate opening for attaching to the fastener. The plate opening (or hole) may optionally be threaded to accommodate a screw. The cap may be stamped over the base as one piece as part of an assembly process.

Figure 10:
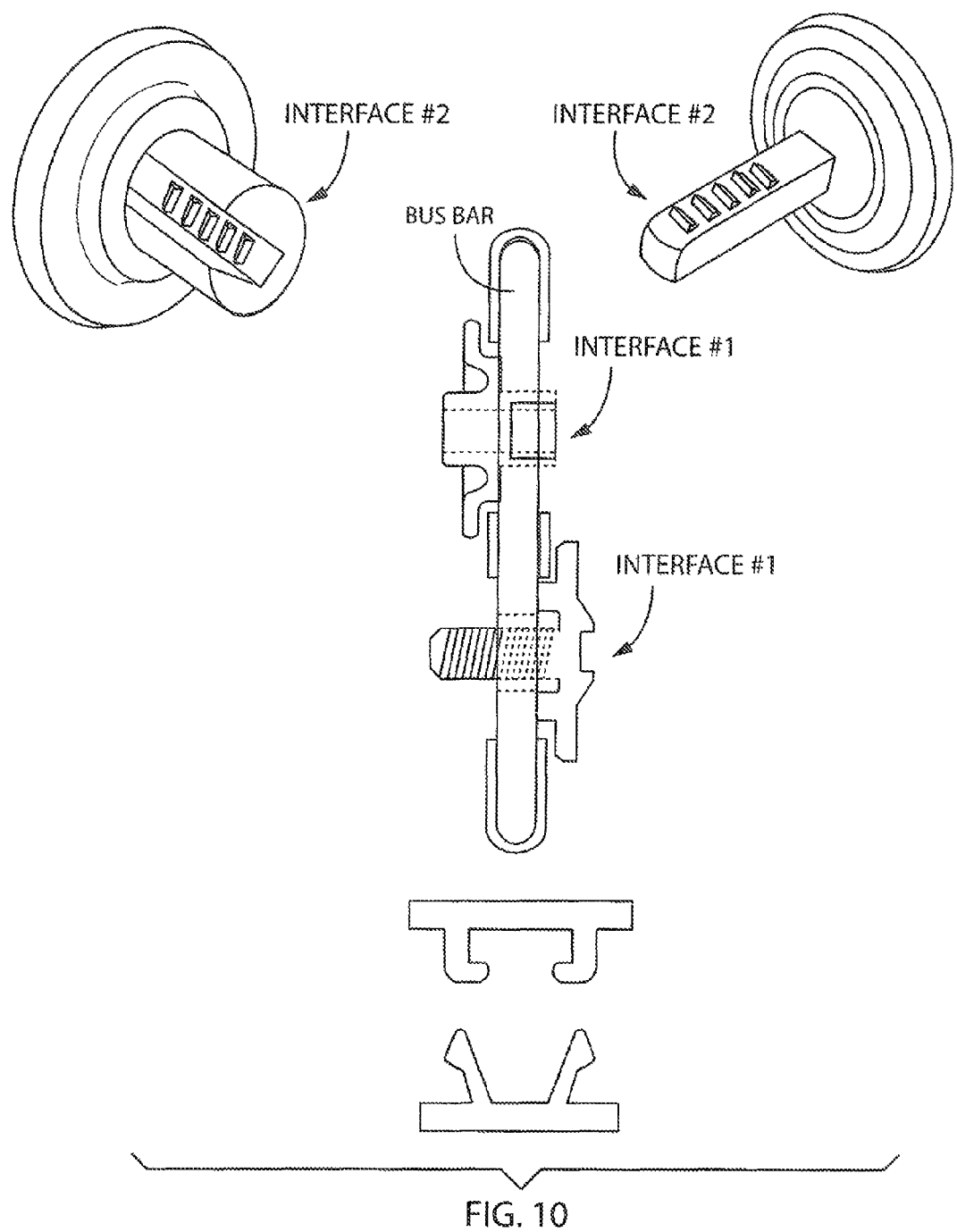
FIG. 10 illustrates additional aspects of a system and method by which a cover assembly may be applied in accordance with an aspect of the invention.

Referring now to FIG. 10, additional aspects of a cover assembly are provided. In particular, snap plugs may be applied for unused epoxy through holes in the electrical system 10. This will allow electrically insulating such through holes with respect to live power conductors in the system. Alternative interfaces may be provided for application to such through holes, and epoxy, shrink tubing or folded boots may be further applied. It will be appreciated that other detailed and/or alternative geometries may be similarly applied for securing a cap to a base in order to electrically isolate a power conductor in a system within the scope of the invention.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention: The embodiments described herein explain the best modes known for practicing the invention and will enable others skilled in the art to utilize the invention. All of the publications described herein including patents and non-patent publications are hereby incorporated herein by reference in their entireties.

The present invention may be part of a "safety system" used to protect human life and limb in a field, construction or other environment. Nevertheless, the term "safety," "safely" or "safe" as used herein is not a representation that the present invention will make the environment safe or that other systems will produce unsafe operation. Safety in such systems depends on a wide variety of factors outside of the scope of the present invention including: design of the safety system, installation and maintenance of the components of the safety system, and the cooperation and training of individuals using the safety system. Although the present invention is intended to be highly reliable, all physical systems are susceptible to failure and provision must be made for such failure.

What is claimed is:

1. A cover assembly comprising:
    a plate element having at least one plate opening and a beveled edge; and
    an electrically insulating cap element having a cap edge followed by an interior recess, wherein the cap element and the plate element are configured to be held together by the beveled edge fitting into the interior recess and the cap edge fitting below the beveled edge,
    wherein the beveled edge of the plate element retains the cap element upon the cap edge of the cap element snapping over the beveled edge of the plate element, and
    wherein the cover assembly is configured to be retained by the at least one plate opening.

2. The cover assembly of claim 1, wherein the plate element is metal and the cap element is plastic.

3. The cover assembly of claim 1, wherein the plate element has only one plate opening, and the plate element and the cap element each have round cross sections.

4. The cover assembly of claim 1, wherein the plate element has at least two plate openings, and the plate element and the cap element each have rectangular cross sections.

5. The cover assembly of claim 1, further comprising a tab configured to engage the plate element over the at least one plate opening.

6. The cover assembly of claim 1, further comprising a fastener passing in part through the at least one plate opening, wherein an end of the fastener is larger than the at least one plate opening, and wherein the end of the fastener is enclosed by an interior volume of the cap element.

7. The cover assembly of claim 1, wherein the beveled edge is circumferentially surrounded by the cap element.

8. The cover assembly of claim 1, wherein the beveled edge is a first beveled edge on a first side of the plate element, and further comprising a second beveled edge on a second side of the plate element, wherein the first and second beveled edges are on opposing sides.

9. A system for isolating power conductors comprising:
    first and second power conductors;
    a fastener joining the first and second power conductors; and
    a cover assembly including:

(a) a plate element having at least one plate opening and a beveled edge; and (b) an electrically insulating cap element having a cap edge followed by an interior recess, wherein the cap element and the plate element are configured to be held together by the beveled edge fitting into the interior recess and the cap edge fitting below the beveled edge, wherein the fastener passes in part through the at least one plate opening, wherein an end of the fastener is larger than the at least one plate opening, wherein the beveled edge of the plate element retains the cap element upon the cap edge of the cap element snapping over the beveled edge of the plate element, and wherein the end is enclosed by an interior volume of the cap element.

10. The system of claim 9, wherein the plate element is metal and the cap element is plastic.

11. The system of claim 9, wherein the plate element has only one plate opening, and the plate element and the cap element each have round cross sections.

12. The system of claim 9, wherein the plate element has at least two plate openings, and the plate element and the cap element each have rectangular cross sections.

13. The system of claim 9, further comprising a tab configured to engage the plate element over the at least one plate opening.

14. The system of claim 9, further comprising a fastener passing in part through the at least one plate opening, wherein an end of the fastener is larger than the at least one plate opening, and wherein the end of the fastener is enclosed by an interior volume of the cap element.

15. The system of claim 9, wherein the beveled edge is circumferentially surrounded by the cap element.

16. The system of claim 9, wherein the beveled edge is a first beveled edge on a first side of the plate element, and further comprising a second beveled edge on a second side of the plate element, wherein the first and second beveled edges are on opposing sides.

17. The system of claim 9, wherein the first power conductor is a power bus riser, the second power conductor is a horizontal bus conductor, and the fastener is a screw.

18. An electrical system comprising:
- a plurality of compartments, each compartment being configured to receive a unit having an electrical component;
- a plurality of first power conductors;
- a plurality of second power conductors;
- a plurality of electrically conductive fasteners, each fastener joining a first power conductor with a corresponding second power conductor; and
- a plurality of cover assemblies, each cover assembly including:
  (a) a plate element having at least one plate opening and a beveled edge; and
  (b) an electrically insulating cap element having a cap edge followed by an interior recess, wherein the cap element and the plate element are configured to be held together by the beveled edge fitting into the interior recess and the cap edge fitting below the beveled edge,
  wherein each fastener passes in part through a plate opening of a cover assembly, wherein an end of each fastener is larger than the plate opening, wherein the beveled edge of the plate element retains the cap element upon the cap edge of the cap element snapping over the beveled edge of the plate element, and wherein the end of each fastener is enclosed by an interior volume of a cap element of the cover assembly.

19. The electrical system of claim 18, wherein the first and second power conductors distribute three-phase power and each first power conductor is electrically connected to a corresponding second power conductor.

20. The electrical system of claim 19, wherein the electrical system is a Motor Control Center (MCC).

* * * * *